(12) United States Patent
Mohankumar et al.

(10) Patent No.: US 11,341,033 B2
(45) Date of Patent: May 24, 2022

(54) METHOD AND SYSTEM FOR AUTOMATED GENERATION OF TEST SCENARIOS AND AUTOMATION SCRIPTS

(71) Applicant: Tata Consultancy Services Limited, Mumbai (IN)

(72) Inventors: Vasantha Priya Mohankumar, Pune (IN); Harish Iyer, Pune (IN); Vishwas Mandpe, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/209,898

(22) Filed: Mar. 23, 2021

(65) Prior Publication Data
US 2021/0326247 A1    Oct. 21, 2021

(30) Foreign Application Priority Data

Apr. 16, 2020  (IN) .............................. 202021016457

(51) Int. Cl.
*G06K 9/62* (2022.01)
*G06F 11/36* (2006.01)
*G06V 10/25* (2022.01)

(52) U.S. Cl.
CPC ...... *G06F 11/3688* (2013.01); *G06F 11/3676* (2013.01); *G06F 11/3684* (2013.01);
(Continued)

(58) Field of Classification Search
CPC ............. G06F 11/3676; G06F 11/3684; G06F 11/3688; G06F 11/3692; G06K 9/6282; G06V 10/25
See application file for complete search history.

(56) References Cited

U.S. PATENT DOCUMENTS 9,600,401 B1 *   3/2017  Haischt ............... G06F 11/3688
2003/0005044 A1 *   1/2003  Miller ..................... H04L 67/02
                                                                 709/224
(Continued)

OTHER PUBLICATIONS

Anbunathan R et al. "Automatic Test Generation from UML Sequence Diagrams for Android Mobiles," 2016 [retrieved on Feb. 25, 2022], International Journal of Applied Engineering Research ISSN 0973-4562 vol. 11, No. 7, pp. 4961-4979, downloaded from <url>:https://www.researchgate.net. (Year: 2016).*

(Continued)

*Primary Examiner* — S. Sough
*Assistant Examiner* — Stephen D Berman
(74) *Attorney, Agent, or Firm* — Finnegan, Henderson, Farabow, Garrett & Dunner LLP

(57) ABSTRACT

A method and system for automated generation of test scenarios and automation scripts. The system is configured to record details of the application at micro level (page level), index based on the page navigation. The system is further configured to create a mind map or a tree using a traverse algorithm. This creates the necessary test scenarios based on flows or page navigation. At the same time, the system captures all the underlying screen properties and labels. The system connects the field type to the action library (built in) and also ensures a dataset is created while capturing the recording. Further utilizing the test scenarios, the dataset, and the screen properties, the system generates the automation script automatically.

15 Claims, 4 Drawing Sheets

(52) U.S. Cl.
CPC ........ *G06F 11/3692* (2013.01); *G06K 9/6282* (2013.01); *G06V 10/25* (2022.01)

(56) References Cited

U.S. PATENT DOCUMENTS

2017/0228220 A1    8/2017   Dai et al.
2019/0213116 A1    7/2019   Kulkarni et al.

OTHER PUBLICATIONS

Unknown, "The Digital Storytelling Tool," Apr. 11, 2016 [retrieved on Feb. 25, 2022], pp. 1-8, downloaded from the Wayback Machine Internet Archive at <url>:https://web.archive.org/web/20160411193243/https://www.pageflow.io/en. (Year: 2016).*

Wang, Chunhui et al., "Automatic Generation of System Test Cases from Use Case Specifications: an NLP-based Approach", Software Engineering, May 2020, Arxiv, https://arxiv.org/pdf/1907.08490.pdf.

Beraldi, Patrizia et al., "Generating scenario trees: A parallel integrated simulation-optimization approach", Journal of Computational and Applied Mathematics, Mar. 2010, vol. 233, Issue 9, pp. 2322-2331, Elsevier, https://reader.elsevier.com/reader/sd/pii/S0377042709006955?token=D68BAAB2A386CC4B895F9A5DBA196B3A79AF74EF9413A5BA88070C59CCE9C88ABB61626382BBAC6AB2FA0141EB5E8ED8.

Mathur, Rajesh et al., "Adaptive Automation: Leveraging Machine Learning to Support Uninterrupted Automated Testing of Software Applications", Software Engineering, Aug. 2015, Arxiv, https://arxiv.org/pdf/1508.00671.pdf.

Swain, Ranjita Kumari et al., "Generation of test cases using activity diagram", Generation of test cases using activity diagram, Aug. 2015, Research Gate, https://www.researchgate.net/publication/255964244_Generation_of_Test_Cases_Using_Activity_Diagram/link/00b495210c56fbf01d000000/download.

* cited by examiner

METHOD AND SYSTEM FOR AUTOMATED GENERATION OF TEST SCENARIOS AND AUTOMATION SCRIPTS

PRIORITY CLAIM

This U.S. patent application claims priority under 35 U.S.C. § 119 to: India Application No. 202021016457, filed on Apr. 16, 2020. The entire contents of the aforementioned application are incorporated herein by reference.

TECHNICAL FIELD

The disclosure herein generally relates to the field of automated testing of software applications, and, more particularly, to method and system for automated generation of test scenarios and automation scripts and autonomous selection of test suites to be used in the testing of the software application.

BACKGROUND

Software applications are designed to accommodate a multitude of transactions, where each transaction often requires the performance of a significant number of functions. Software testing plays a crucial role to ensure the conformance of software applications with their requirements. A test scenario is a manually thought through process to identify possible test that needs to be performed on the application to confirm that the application is working as per the predefined business requirements. In order to test the test scenarios, test engineers need to pass various test data (positive and negative) with the intention to ensure all possible combinations are tested. And the failures are reported for fixes. Exhaustive testing procedures are enforced by functional safety standards which mandate that each requirement be covered by system test cases (test data). Test engineers need to identify all the representative test execution scenarios from requirements, determine the run-time conditions that trigger these scenarios, and finally provide the test input data that satisfy these conditions.

Currently, the test Scenarios are manually written by a developer or a tester based on their knowledge on the application and understanding from requirement specifications. Execution of the test scenarios helps to ensure that defects have not been introduced or uncovered in unchanged areas of codebase as a result of the modification. Today, providers of these applications and/or their corresponding services are faced with the problem of having large test cases (or test data) that are written manually based on users knowledge and the need to automate these test suites to function within any one of a number of industry standard automation tools. Therefore, focus has been on automation to convert these test scenarios into automation scripts using industry tools available in market, and execute it repeatedly and frequently passing various combination of test data. However, with these approaches, industry still scrambles with the problems like exhaustiveness of test scenarios, probability of combination of test data selected, automation script maintains (as only unique id is used for reference), coverage of test, or struggle to select right test suite for execution based on time & urgency etc.

Once automated, these test cases can be executed repeatedly and frequently, which adds to the amount of testing coverage for the respective application. However, to automate these manual test cases is both time consuming and effort intensive.

In agile implementations, every features needs to be delivered as consumable by end of every sprint. Every sprint requires quality of the software to be tested so that it does not break in the real production environment. In this situation, testing becomes a big challenge, as how much to test, what to test, within the time given to ensure higher level of quality. So big struggle is to select the right level of test suite which will ensure higher degree of quality, or informed risk to know the quality of the product before releasing. At present, no technology is available to generate the test scenarios for the completeness. All market tools and products in automation, requires automation tester or engineer to configure or script. It also requires them to recognize the objects every time any changes happens in the user interface, leading to minimal executable automation scripts. Moreover, creating test data for various validations is also a time consuming tasks.

SUMMARY

Embodiments of the present disclosure present technological improvements as solutions to one or more of the above-mentioned technical problems recognized by the inventors in conventional systems. For example, in one embodiment, a system for automated generation of test scenarios and automation scripts for an application is provided. The system comprises an input/output interface, one or more hardware processors and a memory in communication with the one or more hardware processors. The input/output interface provides a capture of a first screen of the application and a data to be used on the captured screen as an input. The memory further configured to perform the steps of: identifying region of interests (ROI), a type of fields and a plurality of values in the captured first screen; identifying a set of elements in the capture of the first screen which are clickable, wherein each of the set of elements have an associated set of coordinates, wherein the clicking of the set of elements results in navigation to a set of screens; assigning a unique ID to each of the set of screens; assigning a sequence number for each of the identified set of elements on the captured screen; passing the captured first screen to an execution engine for execution, wherein execution results in the generation of the set of screens connected to the set of elements; creating a tree using a traverse algorithm using each of the generated set of screens; binding one or more screens out of the set of screens to create the plurality of test scenarios through recursive algorithm combined with breadth first traversal (BFS) and circular algorithm using Pageflow database; storing the created test scenarios in a scenario database; binding the plurality of test scenarios with the data to create a plurality of test cases; creating a plurality of automation scripts using the created test scenarios; and executing the plurality of automation scripts using the execution engine.

In another aspect, a method for automated generation of a plurality of test scenarios and automation scripts for an application is provided. Initially, a capture of a first screen of the application and a data to be used on the captured screen is provided as an input. Further, region of interests (ROI), a type of fields and a plurality of values are identified in the captured first screen. Similarly, a set of elements in the capture of the first screen which are clickable are also identified, wherein each of the set of elements have an associated set of coordinates, wherein the clicking of the set of elements results in navigation to a set of screens. In the next step, a unique ID is assigned to each of the set of screens. Further, a sequence number for each of the identified set of elements on the captured screen are assigned. The captured first screen is then passed to an execution engine for execution, wherein execution results in the generation of the set of screens connected to the set of elements. Further, a tree is created using a traverse algorithm using each of the generated set of screens. In the next step, one or more screens out of the set of screens are bound to create the plurality of test scenarios through recursive algorithm combined with breadth first traversal (BFS) and circular algorithm using Pageflow database. The created test scenarios are then stored in a scenario database. Further, the plurality of test scenarios are bound with the data to create a plurality of test cases. In the next step, a plurality of automation scripts are created using the created test scenarios. And finally, the plurality of automation scripts are executed using the execution engine.

In another aspect the embodiment here provides one or more non-transitory machine readable information storage mediums comprising one or more instructions which when executed by one or more hardware processors cause automated generation of a plurality of test scenarios and automation scripts for an application is provided. Initially, a capture of a first screen of the application and a data to be used on the captured screen is provided as an input. Further, region of interests (ROI), a type of fields and a plurality of values are identified in the captured first screen. Similarly, a set of elements in the capture of the first screen which are clickable are also identified, wherein each of the set of elements have an associated set of coordinates, wherein the clicking of the set of elements results in navigation to a set of screens. In the next step, a unique ID is assigned to each of the set of screens. Further, a sequence number for each of the identified set of elements on the captured screen are assigned. The captured first screen is then passed to an execution engine for execution, wherein execution results in the generation of the set of screens connected to the set of elements. Further, a tree is created using a traverse algorithm using each of the generated set of screens. In the next step, one or more screens out of the set of screens are bound to create the plurality of test scenarios through recursive algorithm combined with breadth first traversal (BFS) and circular algorithm using Pageflow database. The created test scenarios are then stored in a scenario database. Further, the plurality of test scenarios are bound with the data to create a plurality of test cases In the next step, a plurality of automation scripts are created using the created test scenarios. And finally, the plurality of automation scripts are executed using the execution engine.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
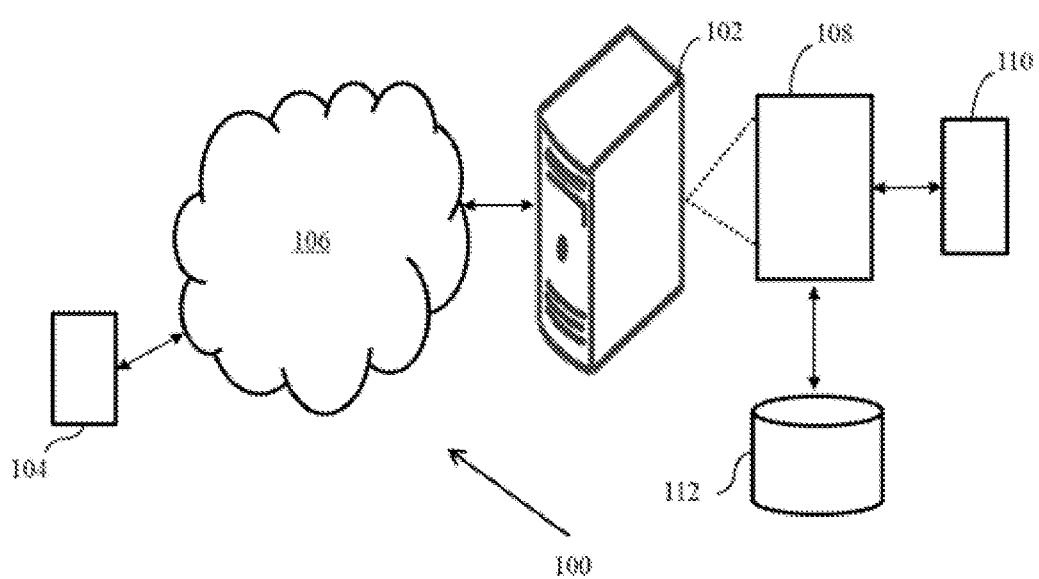
FIG. 1 illustrates a network diagram of an exemplary system for automated generation of a plurality of test scenarios and automation scripts for an application according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method.

FIG. 1 illustrates a block diagram of a system 100 for automated generation of a plurality of test scenarios and automation scripts for an application, in accordance with an example embodiment. The application may be any application which is created using any programming language. For example, the application can be a website, a software, a desktop, mainframe a portal, a database etc. The system 100 is configured to record details of the application at micro level (page level), index based on the page navigation. The system 100 is further configured to create a mind map or a tree using a traverse algorithm. This will create the necessary test scenarios based on flows or page navigation. During the same time, the system 100 captures all the underlying screen properties and labels. Connect the field type to the action library (built in). Also ensure dataset is created while capturing the recording. Further utilizing the test scenarios, data set and the screen properties to generate the automation script automatically.

The system 100 is implemented on one or more computing devices 102, such as a laptop computer, a desktop computer, a notebook, a workstation, a cloud-based computing environment and the like. It will be understood that the system 100 may be accessed through an input/output interface referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 is communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network may include a variety of network devices, including routers, bridges, servers, computing devices, storage devices. The network devices within the network may interact with the system 100 through communication links.

According to an embodiment of the disclosure, the system 100 further comprises one or more hardware processors 108, a memory 110 in communication with the one or more hardware processors 108 and a data repository 112. The one or more hardware processors 108 are configured to execute programmed instructions stored in the memory 110, to perform various functions as explained in the later part of the disclosure. The data repository 112 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
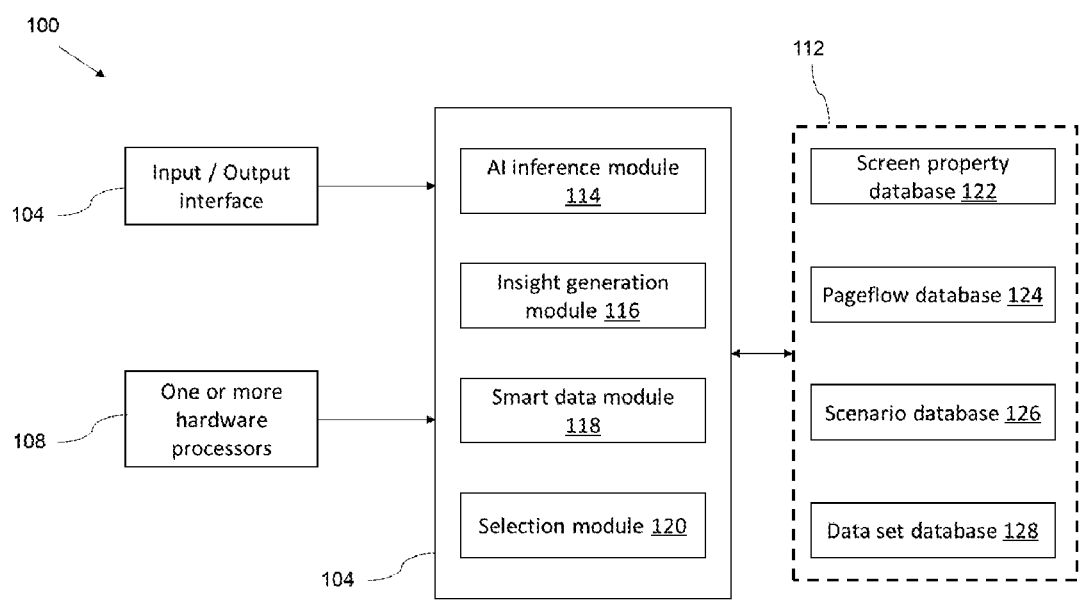
FIG. 2 illustrates a block diagram of the system of FIG. 1 according to some embodiments of the present disclosure.

According to an embodiment of the disclosure, the memory 110 comprises a plurality of modules as shown in the block diagram of FIG. 2. The plurality of modules are set of instructions and configured to perform a plurality of functions. The plurality of modules comprises an artificial intelligence (AI) inference module 114, an insight generation module 116, a smart data module 118 and a selection module 120.

Figure 3A:
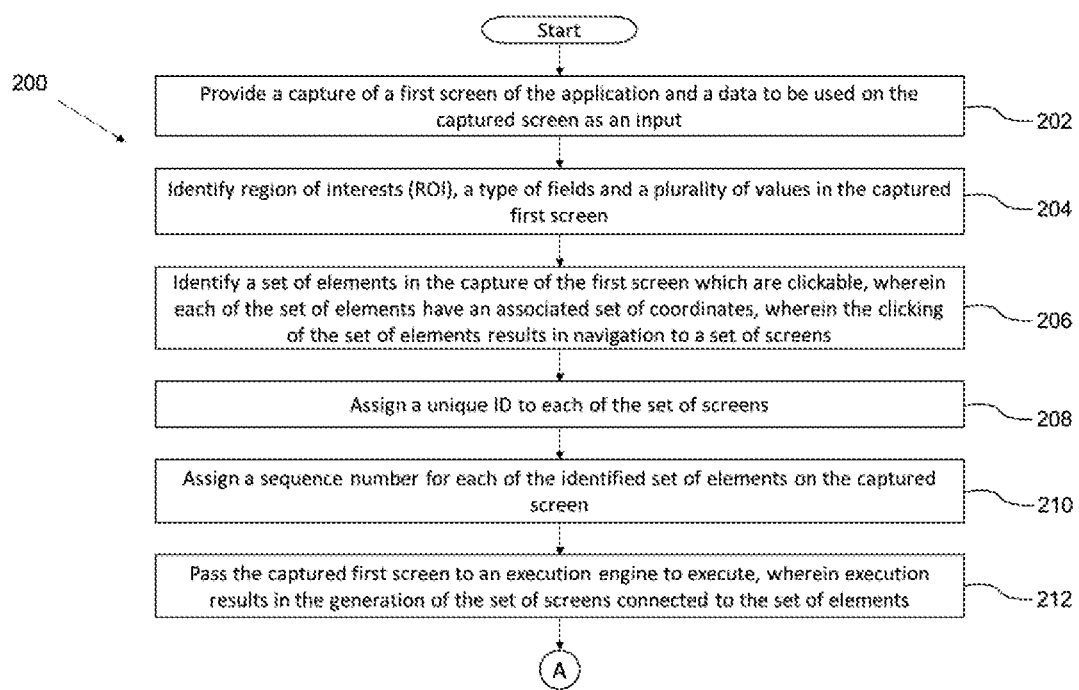
FIG. 3A-3B is a flow diagram illustrating a method for automated generation of a plurality of test scenarios and automation scripts for an application in accordance with some embodiments of the present disclosure.
Figure 3B:
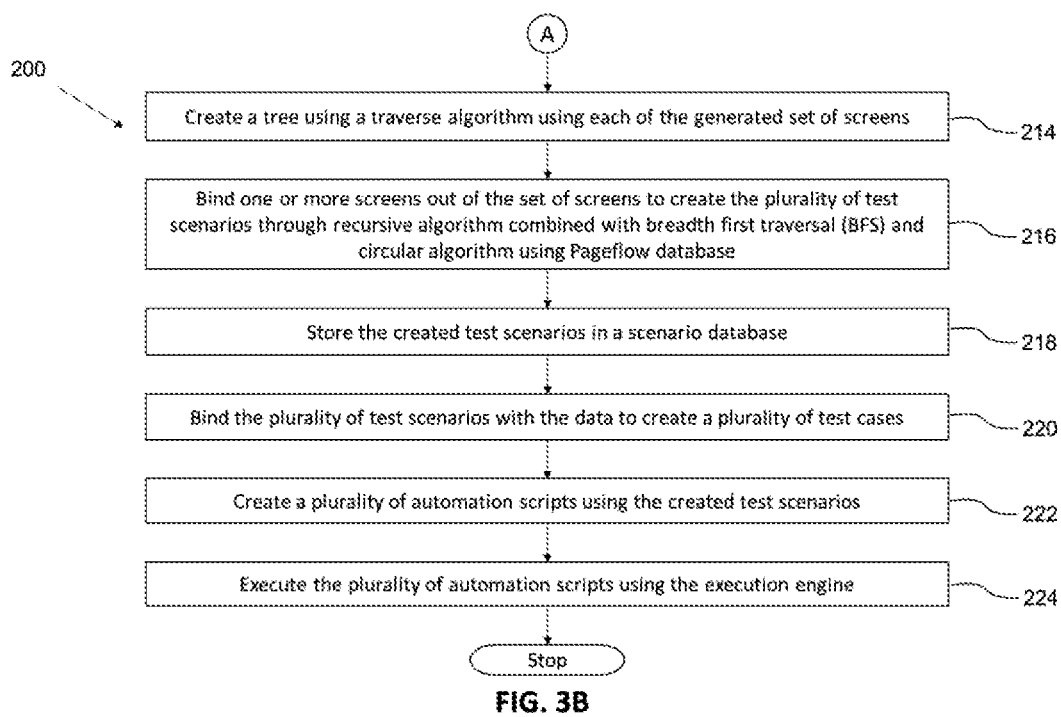

Referring to FIGS. 3A-3B, flow diagram of a method for automated generation of a plurality of test scenarios and automation scripts for the application is described in accordance with an example embodiment. The method 200 depicted in the flow chart may be executed by a system, for example, the system, 100 of FIG. 1. In an example embodiment, the system 100 may be embodied in the computing device as explained above.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

Initially at step 202, the capture of the first screen of the application and a data to be used on the captured screen is provided as the input. Further at step 204, a region of interests (ROI), a type of fields and a plurality of values are identified in the captured first screen using the artificial intelligence (AI) inference module 114. The ROI, the type of fields and the plurality of values may be referred as a plurality of properties for a set of elements present in the captured screen. It should be appreciated that the plurality of properties are not limited to above mentioned list. A plurality of AI algorithms are used for the identification of the plurality of properties. The plurality of algorithms intended for extraction of the plurality of properties may comprise Connectionist Text Proposal Network (CTPN) algorithm, fully convolutional networks (FCN algorithm), RetinaNet algorithm etc.

According to an embodiment of the disclosure, the plurality of properties can also be identified using the record method via the insight generation module 116. In the record method all the set of screens of the application are recorded by the system 100. Further, in the record method the information is extracted using JavaScript Object Notation (json) file format. Thus the plurality of properties identified using AI inference module 114 and the insight generation module 116 are saved in a screen property database 122. It should be appreciated that the screen property database may be the part of the data repository 112.

At step 206, the set of elements, which are clickable, are identified in captured first screen. Each of the identified set of elements have an associated set of coordinates. The set of coordinates are decided based on the size of a display device on which the application is being used. In addition to that, the type of clickable elements is also identified. For example, which elements out of the set of elements are submit buttons, which elements out of the set of elements are drop down menu, entry button etc. The clicking of the set of elements results in navigation to a set of screens. The set of screens are the screens which are present in the application. At step 208, a unique ID is also assigned to each of the set of screens.

Similarly, at step 210, a sequence number is assigned for each of the identified set of elements on the captured first screen. The same step is also followed for future screens. For example, "username" will be first sequence, "password" will be second, "submit" is third, "forgot password" is fourth and so on.

At step 212, the captured first screen is passed to an execution engine for execution. The execution of the captured first screen results in the generation of the set of screens connected to the set of elements present on the first screen. The process of execution results in the execution of the set of elements present on the captured first screen. For example, first the "username" will be provided, followed by "password" and then "submit". This results in navigation to the next screen of the application. At the next screen the same process of execution is performed.

At step 214, a tree or a mind map is created using a traverse algorithm using each of the generated set of screens. The tree tells about all the existing navigations possible in the application from one screen to another screen. The traverse algorithm is a breadth first algorithm, it is used for traversing or searching tree structures. The breadth first algorithm starts at the tree root (or some arbitrary node of a graph, sometimes referred to as a search key, and explores all of the neighbor nodes at the present depth prior to moving on to the nodes at the next depth level. The breadth first algorithm uses the opposite strategy as depth-first search, which instead explores the node branch as far as possible before being forced to backtrack and expand other nodes.

According to an embodiment of the disclosure, the system 100 is also configured to validate any modification in the captured first screen or any of the set of screens based on the business requirement changes. The validation is mainly performed when the input is captured using the record method. Initially, each of the set of screens are validated using a Pageflow database 124. The set of screens and connection points through node connection logic are then re-matched. The plurality of properties of modified element are revisited through screen ID as reference. And finally, the data set with modifications to the elements through Screen ID as reference is modified. This modified data is also stored in the screen property database 122.

According to an embodiment of the disclosure, the system 100 is also configured to validate if any screen has been deleted from the application. This is done by soft deleting the screen by matching screen ID. The properties of the related screen is also deleted by matching screen ID. And data set related to the screen is also deleted by matching screen ID. The logic validates the connection of the screen flow is not impacted because of the delete of a particular screen. It will check on the prior and next node, prompt user to make necessary modification if any to those screen connections too.

According to an embodiment of the disclosure, the system 100 is also configured to get the data using the smart data module 118. Initially all the documents related to the application are collected. The documents may include user manual, user guide and various other. All the documents are then scanned for a particular caption which is present in the screen through machine learning using intent. All the possible data values are then listed for each element using captions. These data values are again stored in the data set database 128.

Further at step 216, one or more screens out of the set of screens are bound to create the plurality of test scenarios through recursive algorithm combined with breadth first traversal (BFS) and circular algorithm using the Pageflow database 114. At the same time, the plurality of properties of the captured screen are also bound to the data set for each of the set of screens. And a default data set is also bound for each of the set of screens to the each of the path created. Thus, the set of screens involved in navigation from one screen to another screen, the set of elements present in those set of screens and corresponding data relevant to those set of screens will result in generation of one test case scenario. At step 218, the created test scenarios are stored in a scenario database 126. It should be appreciated that the scenario database 126 may be the part of the data repository 112. Additionally, these test scenarios can also be directly given to the execution engine. At next step 220, the plurality of test scenarios are bound with the data to create a plurality of test cases.

According to an embodiment of the disclosure, the test scenarios can also be generated manually. In this case the data set is created manually for each screen using the smart data list stored in the scenario database 126. The created data set can be stored in a data set database 128. It should be appreciated that the data set database 128 can also be part of the data repository 112. The created data set is then bound through smart data to the required path for the necessary screen to create the test scenarios. These test scenarios are also stored in the scenario database 126. The manual generation of the test scenario is done by cloning the existing test scenario, as the purpose will mainly be to increase the data input for a particular screen, as in system generated only one dataset for one screen is passed. For example, Example purchase order may require validation by adding 10 items to the purchase order.

At step 222 a plurality of automation scripts are created using the created test scenario. The test scenarios are bound with the data sets and screen properties by referring to unique ID to create the plurality of automation scripts. And finally at step 224, the plurality of automation scripts are executed using the execution engine. The use of any execution engine is well within the scope of this disclosure. Some examples include Selenium, Winium, HP UFT etc.

According to an embodiment of the disclosure, the system 100 also comprises a selection module 120. The selection module 120 is configured to select one or more of test scenarios out of the plurality of test scenarios based on one or more changes happen in the application. The selection module 120 ensures the user to identify the appropriate test scenarios which need to be tested depending on the changes.

The selection module 120 is also configured to identify business impact scenarios by comparing the current baseline vs previous baseline screens for each of the navigation paths. In other words, the current version of the screen is compared with the previous baseline versions to identify the changes in the current screen. The further versions are the screens which are changed versions as compared to the baseline screen.

According to an embodiment of the disclosure, the selection module 120 is also configured to optimally identify a set of test scenarios which are affecting the functionality of the application. The selection module 120 is configured to select the one or more test scenarios based on following three conditions. First, the selection module 120 is configured to optimally identify one or more test scenarios such a way that they covers the complete coverage of testing of the application. The complete coverage refers each and every possible paths of the application are covered. The optimized test scenarios are identified using paths with leaf nodes and the highest number of node occurrence. It should be appreciated that in another example, all the bind paths may also be listed (system generated scenarios) which were created using connection logic.

Second, the selection module 120 is also configured to identify one or more scenarios for execution out of the plurality of scenarios based on the defect prone paths. The defect prone paths are the paths which are most prone to defect at the time of the execution. The defect prone paths are identified by sum of maximum failures against a screen and related path. Initially, one or more screens are identified which have more than a predefined number of failures occurred in the past, wherein the one or more screens are referred as defect prone, Followed by the identification of paths related to the identified one or more screens. And finally, one or more scenarios are selected for execution out of the plurality of scenarios which are related the one or more screens and the paths.

Third, the selection module 120 is also configured to identify the code impact scenario which are affecting the functionality of the application. In code impact scenario, each of the set of screens are mapped to the class and method based on the logs. When any change in the method is traced through log and related screens are marked as change. Based on the previous and current baseline related to code change, set of test scenarios with related test data is selected automatically for execution.

According to an embodiment of the disclosure, the system 100 can also be explained with the help of an example of a ticketing tool. The ticketing tool is used to raise bugs and create user stories. In this tool, a user has to login, go to the respective workspace, create the relevant tickets and then log out.

According to an embodiment of the disclosure, the input would be the capture of first screen along with the supporting data such as username and password required to enter the ticketing tool. In another embodiment the inputs could be the capture of all the screens. In the present example, all the captured screens would be login page, home page, ticket add page and logout page. The complete flow will be captured along with automated test scenarios and test scripts are then generated by the system 100. The relevant test data can be passed and mapped to the required fields. Further, the automated test scenarios will be generated by the system depending on the various requirement as shown below:

For 100% coverage, the test scenario covers:
   login to home page
   login to home page to ticket add page
   login to home page to ticket add page to logout page
For optimized path, the test scenario covers:
   login to home page to ticket add page to logout page
For defect prone path, the test scenario covers:
   If after multiple runs ticket add had many failures, then last 2 scenarios which has ticket add will be selected and executed
Code Impact scenario, the test scenario covers:
   If code for ticket add has been changed using its related method, last 2 scenarios which has ticket add will be selected and executed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem such time consumption and manual effort in test scenarios and automation scripts generation. The embodiment, thus provides method for automated generation of a plurality of test scenarios and automation scripts for an application.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automated generation of a plurality of test scenarios and automation scripts for an application, the method comprising:
   providing, via one or more hardware processors, a capture of a first screen of the application and a data to be used on the captured screen as an input;
   identifying, via the one or more hardware processors, a region of interests (ROI), a type of fields and a plurality of values in the captured first screen;
   identifying, via the one or more hardware processors, a set of elements in the capture of the first screen which are clickable, wherein each of the set of elements have an associated set of coordinates, wherein clicking of the set of elements results in navigation to a set of screens;
   assigning, via the one or more hardware processors, a unique identifier to each of the set of screens;
   assigning, via the one or more hardware processors, a sequence number for each of the set of elements on the captured screen;
   passing, via the one or more hardware processors, the captured first screen to an execution engine for execution;
   executing the captured first screen, wherein the executing results in generation of the set of screens connected to the set of elements;
   creating, via the one or more hardware processors, a tree using a traverse algorithm using each of the set of screens connected to the set of elements;
   binding, via the one or more hardware processors, one or more screens out of the set of screens to create the plurality of test scenarios through recursive algorithm combined with breadth first traversal (BFS) and circular algorithm using a digital storytelling database;
   storing, via the one or more hardware processors, the plurality of test scenarios in a scenario database;
   binding, via the one or more hardware processors, the plurality of test scenarios with the data to create a plurality of test cases;
   creating, via the one or more hardware processors, a plurality of automation scripts using the plurality of test scenarios; and
   executing, via the one or more hardware processors, the plurality of automation scripts using the execution engine.

2. The method of claim 1 further comprising selecting one or more test scenarios out of the plurality of test scenarios based on business impact, comprising:
   identifying a set of business impact scenarios by comparing a baseline version and next versions of the one or more screens for all paths of the test scenarios; and
   listing test scenarios created using a connection logic.

3. The method of claim 1 further comprising identifying optimized test scenarios using paths with one or more leaf nodes and a highest number of node occurrence.

4. The method of claim 1 further comprising selecting one or more test scenarios out of the plurality of test scenarios based on a change in a code of the application, comprising:
mapping each of the set of screens to a class and a method based on logs;
tracing any change in the method through logs and screens related to the logs;
comparing a previous and a current baseline versions of the screens to identify the change in the code; and
selecting the one or more test scenarios related to the screens, where the change in the code is identified, for execution.

5. The method of claim 1 further comprising the step of generating the plurality of test scenarios covering each possible path of the application.

6. The method of claim 1 further comprising identifying one or more scenarios out of the plurality of test scenarios based on defect prone paths, the method further comprising:
identifying one or more screens which have more than a predefined number of failures occurred in the past, wherein the one or more screens which have more than the predefined number of failures are referred to as defect prone;
identifying paths related to the identified one or more screens which have more than the predefined number of failures; and
selecting the one or more scenarios which have more than the predefined number of failures for execution out of the plurality of test scenarios.

7. The method of claim 1 further comprising manually generating test data, comprising:
scanning a plurality of documents related to the application to identify captions in the set of screens through machine learning using intent;
listing all possible data values for each of the set of elements using the captions;
storing the possible data values in a data set database;
creating a dataset manually for each of the set of screens using the possible data values;
binding the created dataset to a required path for a necessary screen, wherein the bound dataset is a test scenario; and
storing the test data in the scenario database.

8. The method of claim 1, further comprising validating a set of screens captured using the digital storytelling database if there is a modification, a deletion or an addition.

9. The method of claim 1, further comprising providing input by:
providing all screens present in the application and connections between the screens present in the application, or
recording all the screens present in the application.

10. The method of claim 1, wherein the execution engine is a unified functional testing (UFT) tool.

11. A system for automated generation of a plurality of test scenarios and automation scripts for an application, wherein the system comprises:
an input/output interface for providing a capture of a first screen of the application and a data to be used on the captured screen as an input;
one or more hardware processors; and
a memory in communication with the one or more hardware processors, the memory further configured to perform:
identifying a region of interests (ROI), a type of fields and a plurality of values in the captured first screen;
identifying a set of elements in the capture of the first screen which are clickable, wherein each of the set of elements have an associated set of coordinates, wherein the clicking of the set of elements results in navigation to a set of screens;
assigning a unique identifier to each of the set of screens;
assigning a sequence number for each of the set of elements on the captured screen;
passing the captured first screen to an execution engine for execution;
executing the captured first screen, wherein the executing results in generation of the set of screens connected to the set of elements;
creating a tree using a traverse algorithm using each of the set of screens connected to the set of elements;
binding one or more screens out of the set of screens to create the plurality of test scenarios through recursive algorithm combined with breadth first traversal (BFS) and circular algorithm using a digital storytelling database;
storing the plurality of test scenarios in a scenario database;
binding the plurality of test scenarios with the data to create a plurality of test cases;
creating a plurality of automation scripts using the plurality of test scenarios; and
executing the plurality of automation scripts using the execution engine.

12. The system of claim 11 further comprising selecting one or more test scenarios out of the plurality of test scenarios based on business impact, comprising:
identifying a set of business impact scenarios by comparing a baseline version and next versions of the one or more screens for all paths of the test scenarios; and
listing test scenarios created using a connection logic.

13. The system of claim 11 further comprising manually generating test data, comprising:
scanning a plurality of documents related to the application to identify captions in the set of screens through machine learning using intent;
listing all possible data values for each of the set of elements using the captions;
storing the possible data values in a data set database;
creating a dataset manually for each of the set of screens using the possible data values;
binding the created dataset to a required path for a necessary screen, wherein the bound dataset is a test scenario; and
storing the test data in the scenario database.

14. The system of claim 11, wherein the execution engine is a unified functional testing (UFT) tool.

15. One or more non-transitory machine readable information storage mediums comprising one or more instructions which when executed by one or more hardware processors cause automated generation of a plurality of test scenarios and automation scripts for an application, the one or more instructions comprising:
providing a capture of a first screen of the application and a data to be used on the captured screen as an input;
identifying a region of interests (ROI), a type of fields and a plurality of values in the captured first screen;
identifying a set of elements in the capture of the first screen which are clickable, wherein each of the set of elements have an associated set of coordinates, wherein the clicking of the set of elements results in navigation to a set of screens;

assigning a unique identifier to each of the set of screens;

assigning a sequence number for each of the set of elements on the captured screen;

passing the captured first screen to an execution engine for execution;

executing the captured first screen, wherein the executing results in generation of the set of screens connected to the set of elements;

creating a tree using a traverse algorithm using each of the set of screens connected to the set of elements;

binding one or more screens out of the set of screens to create the plurality of test scenarios through recursive algorithm combined with breadth first traversal (BFS) and circular algorithm using a digital storytelling database;

storing the plurality of test scenarios in a scenario database;

binding the plurality of test scenarios with the data to create a plurality of test cases;

creating a plurality of automation scripts using the plurality of test scenarios; and executing the plurality of automation scripts using the execution engine.

\* \* \* \* \*